United States Patent
Trinh et al.

(10) Patent No.: US 6,590,001 B2
(45) Date of Patent: Jul. 8, 2003

(54) ROTATING ANNULAR CATALYTIC REACTOR

(75) Inventors: Sinh Han Trinh, Ponca City, OK (US); Harold A. Wright, Ponca City, OK (US)

(73) Assignee: ConocoPhillips Company, Houston, TX (US)

(*) Notice: Subject to any disclaimer, the term of this patent is extended or adjusted under 35 U.S.C. 154(b) by 25 days.

(21) Appl. No.: 10/021,948

(22) Filed: Dec. 13, 2001

(65) Prior Publication Data

US 2002/0086910 A1 Jul. 4, 2002

Related U.S. Application Data

(60) Provisional application No. 60/255,243, filed on Dec. 13, 2000.

(51) Int. Cl.[7] ............................................. C07C 27/00
(52) U.S. Cl. ..................................... 518/700; 518/715
(58) Field of Search ................................. 518/700, 715

(56) References Cited

U.S. PATENT DOCUMENTS 2,486,505 A * 11/1949 Stratford et al. ............ 518/712
4,952,374 A * 8/1990 Baillie ........................ 422/110

* cited by examiner

Primary Examiner—J. Parsa
(74) Attorney, Agent, or Firm—Conley Rose, P.C.

(57) ABSTRACT

A method and apparatus for converting gaseous reactants to liquid products catalyzed by stable catalysts. The method comprises providing a rotatable catalyst bed comprising Gas to Liquid (GTL) catalyst, feeding a gaseous stream of reactants into the catalyst bed and providing a pressure drop across the catalyst bed such that the gaseous stream flows through the catalyst bed so as to produce a gas output and a liquid product, and rotating the catalyst bed so as to enhance passage of said liquid product from the catalyst bed. The preferred apparatus comprises a rotatable fixed bed catalyst system including a catalyst active for converting syngas to hydrocarbons, a feed gas line for providing syngas to the catalyst bed, a liquid output line for receiving liquid output from the catalyst bed, and a gas output line for receiving gas output from the catalyst bed.

17 Claims, 1 Drawing Sheet

ROTATING ANNULAR CATALYTIC REACTOR

RELATED APPLICATIONS

The present application claims benefit of priority from U.S. application Ser. No. 60/255,243, filed Dec. 13, 2000, and entitled "Rotating Annular Catalytic Reactor."

STATEMENT REGARDING FEDERALLY SPONSORED RESEARCH OR DEVELOPMENT

Not applicable.

TECHNICAL FIELD OF THE INVENTION

The present invention relates to a method of operating a catalyst bed for the preparation of More particularly, this invention relates to a rotatable catalyst bed comprising a gas to liquid (GTL) catalyst. Still more particularly, the present invention relates to a rotatable bed multiphase catalytic reactor that allows removal of liquid products from the catalyst bed as they form and thus reduces the formation of waxes and other high molecular weight products.

BACKGROUND

Large quantities of methane, the main component of natural gas, are available in many areas of the world, and natural gas is predicted to outlast oil reserves by a significant margin. However, most natural gas is situated in areas that are geographically remote from population and industrial centers. The costs of compression, transportation, and storage make its use economically unattractive. To improve the economics of natural gas use, much research has focused on the use of methane as a starting material for the production of higher hydrocarbons and hydrocarbon liquids, which are more easily transported and thus more economical. The conversion of methane to hydrocarbons is typically carried out in two steps. In the first step, methane is converted into a mixture of carbon monoxide and hydrogen (i.e., synthesis gas or syngas). In a second step, the syngas is converted into hydrocarbons.

This second step, the preparation of hydrocarbons from synthesis gas, is well known in the art and is usually referred to as Fischer-Tropsch synthesis, the Fischer-Tropsch process, or Fischer-Tropsch reaction(s). Fischer-Tropsch synthesis generally entails contacting a stream of synthesis gas with a catalyst under temperature and pressure conditions that allow the synthesis gas to react and form hydrocarbons.

More specifically, the Fischer-Tropsch reaction entails the catalytic hydrogenation of carbon monoxide to produce any of a variety of products ranging from methane to higher alkanes and aliphatic alcohols. The reaction is carried out by contacting the hydrogen and carbon monoxide with a catalyst. The reaction gives off a large amount of heat. When the Fischer-Tropsch reaction is carried out in fixed-bed reactors, this high heat of reaction results in an increase in the temperature of the catalyst bed above that of the surrounding environment. Excessive temperature rises can lead to inferior product distribution, and can damage the catalyst if not controlled.

When the Fischer-Tropsch process is carried out in a fixed bed reactor, synthesis gas is fed via an inlet into direct contact with the catalyst while heat is removed from the catalyst bed via heat exchange catalyst and a heat exchange medium, e.g., water. The heat exchange medium is typically contained in one or more tubular conduits passing through the catalyst bed. The optimum temperature gradient between the catalyst and the heat exchange medium must be one wherein the catalyst produces a product having the desired spectrum of hydrocarbons, while the catalyst bed remains thermally stable.

Slurry reactors avoid the problem of paraffinic buildup by suspending the catalyst in the liquid reaction products. On the other hand, the mass transfer rate, which is determined by the ability of the feed gases to reach a catalyst surface, is greatly reduced as compared to fixed-bed reactors. This is because the liquid products of the catalyzed reaction coat the surfaces of the catalyst bed and thus reduce the contact between the feed gases and the catalyst. In addition, catalysis continues while the liquid products remain in contact with a catalyst surface. As the reactions proceed, some of the hydrocarbons grow large enough that they undergo a phase transformation from liquid to solid at reactor conditions. Solids formed in the catalyst bed in this manner are highly undesirable, as they obstruct the surface of the catalyst are relatively difficult to dislodge.

The foregoing issues arise in gas-to-liquid systems, including Fischer-Tropsch systems. Hence, a need exists for a gas-to-liquid system that avoids the inefficiency and operating difficulty caused by the buildup of liquid and solid reaction products in the catalyst bed. It is further desired to provide a system that allows control over the residence time or contact time for the liquid products in the catalyst bed. In addition, the desired system would provide the advantageous mass transfer rate of fixed bed reactors, and yet avoid the need for period removal of solids from the bed.

SUMMARY OF THE INVENTION

The present system and apparatus avoids the inefficiency and operating difficulty caused by the buildup of liquid and solid reaction products in the catalyst bed. The present system enhances separation of the products and allows control over the residence time or contact time for the liquid products in the catalyst bed. In addition, the present system provides the advantageous mass transfer rate of fixed bed reactors, and yet avoids the need for periodic removal of solids from the bed. The desired process allows the removal of liquid products from the catalyst bed at a desired rate, which means that the residence time of the liquids in the reactor, and thus the product distribution, can be controlled.

The present invention is applicable to any GTL reactions that are catalyzed by stable solid catalyst, such as Fischer-Tropsch reactions or methanol synthesis reactions.

BRIEF DESCRIPTION OF THE FIGURE

For a more detailed understanding of the present invention, reference will be made to the accompanying FIGURE, which is a schematic cross-section of a rotating gas to liquids reactor constructed in accordance with a preferred embodiment.

DETAILED DESCRIPTION

Figure 1:
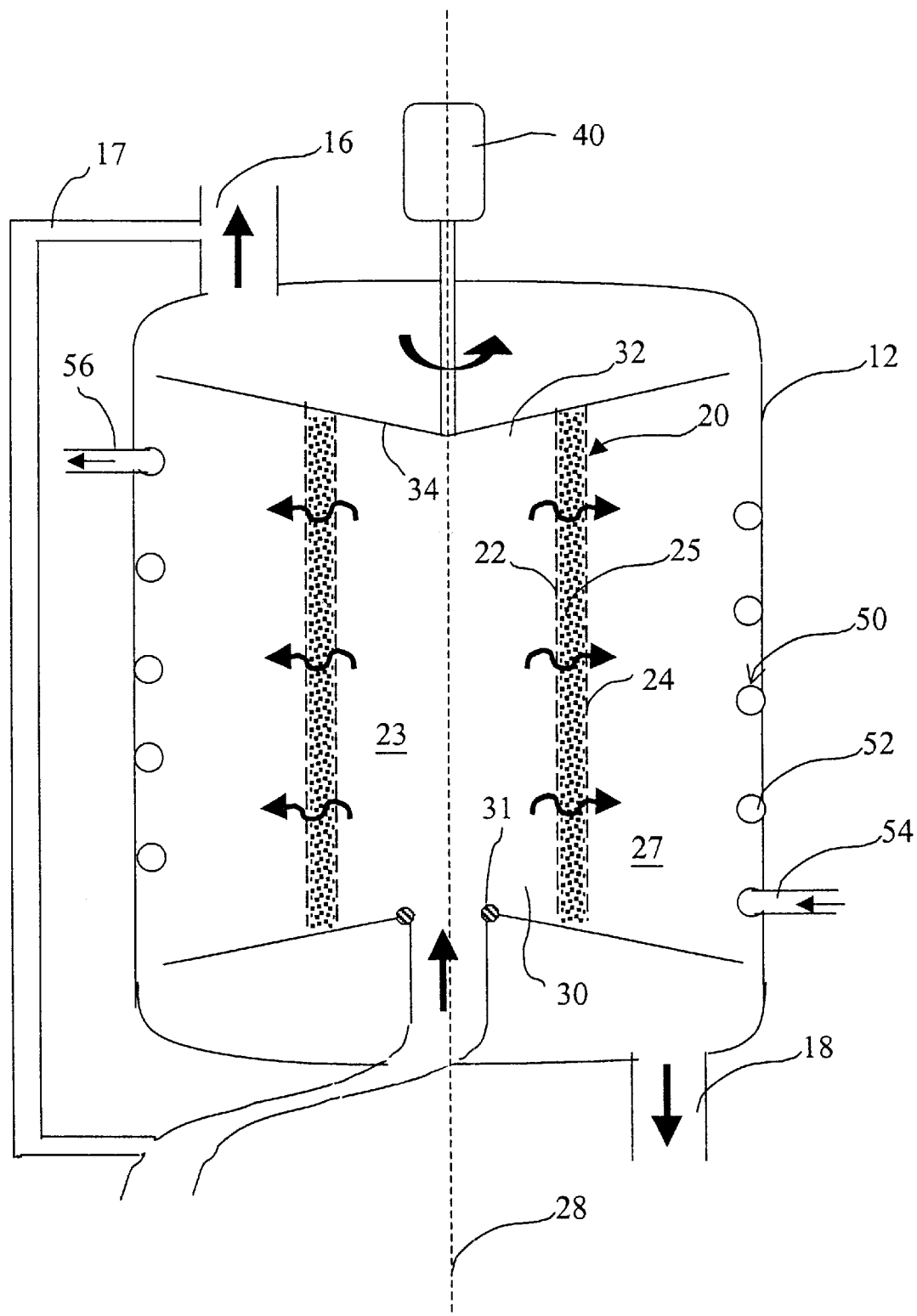

While the present invention is described below in the context of a Fischer-Tropsch system, it will be understood that the devices and principles disclosed herein are equally applicable to any gas-to-liquids operation that uses a solid catalyst. Reactor Referring now to the FIGURE, a preferred embodiment of the present system comprises a reactor 10 that includes reactor housing 12 and an annular catalyst bed 20. Annular bed 20 is defined by inner and outer catalyst retainers 22, 24, respectively, which preferably comprise concentric tubular members having a common vertical axis 28. The inside of inner catalyst retainer 22 defines a central chamber 23, an annulus 25 is defined between catalyst retainers 22 and 24, and an annular outer chamber 27 is defined between outer catalyst retainer 24 and the reactor housing 12.

In one preferred embodiment, the radius of retainer 22 is between 2 and 20 cm and the radius of retainer 24 is between 4 and 40 cm, but it is understood that retainers 22 and 24 can have any desired radius, so long as annulus 25 is wide enough to contain a desired amount of catalyst. Similarly, bed 20 is preferably but not necessarily between 5 and 50 cm tall. In an alternative embodiment, central chamber 23 can be eliminated, or replaced with any alternative gas distribution device that allows gas to flow radially outward through the full height of the catalyst bed at substantially uniform pressure.

Central chamber 25 preferably includes a lower end 30 and an upper end 32, with upper end 32 being closed by an end wall 34. Annulus 23 is preferably packed with a suitable Fischer-Tropsch catalyst system, which may comprise supported or unsupported Fischer-Tropsch catalyst provided in a form having a relatively high surface area, such as saddles, rings, stacked layers of mesh, sponge, porous particles, or the like, such as are known in the art. Inner and outer walls 22, 24 are preferably perforated or comprise mesh or the like, so as to allow the passage therethrough of gas and liquid while still containing the catalyst packing.

Reactor 10 further includes an feed gas inlet 14, a gas outlet 16 and a liquid outlet 18. Feed gas inlet 14 opens into lower end 30 of chamber 23. A rotating seal 31 is preferably provided between the stationary gas inlet 14 and the rotating bed 20. Gas outlet 16 and liquid outlet 18 both preferably communicate with outer chamber 27.

According to a preferred embodiment of the invention, annular catalyst bed 20 is mounted on a bearing (not shown) so as to be rotatable around axis 28. The system includes a motor 40 engaging bed 20 for driving rotation of bed 20. While motor 40 is shown mounted at the upper end of the bed 20, it will be understood that the position of motor 40 is not important to operation of the present system. Likewise, it is not important that the bed rotate relative to the rest of the reactor 10; the entire reactor 10 can rotate in the manner described herein. In an alternative embodiment, catalyst bed is rotatable about a non-vertical axis, such as a horizontal axis, although such an embodiment is not preferred.

Reactor 10 preferably includes a cooling system 50, which, in one preferred embodiment, comprises at least one cooling tube 52 in thermal contact with outer chamber 27. Cooling tube 52 can comprise a coiled tube that spirals around the circumference of chamber 27, as shown, or can be any other suitable configuration that is suitable for effective heat exchange between the cooling system and the contents of chamber 27. A cooling medium, such as water, enters cooling tube 52 at its inlet end 54 and exits at its exit end 56 after absorbing heat from chamber 27. The heated medium can be used as a heat source in another system, or simply cooled and recycled. It will be understood that cooling system 50 can take other forms, including any suitable heat-removal device capable of removing heat from the system without interfering with the catalytic reaction, including but not limited to multiple tubes, cooling fins, heat sinks, etc.

Operation

In operation, the inside of reactor 20, and in particular catalyst bed 20, is maintained at desired Fischer-Tropsch reaction-promoting conditions, such as are known in the art. Catalyst bed 20 is rotated at a predetermined rotation rate, which is set as discussed below. A feed gas stream comprising a mixture of CO and hydrogen (syngas) enters inner chamber 23 via inlet 14. Because inlet 14 is at a slightly higher pressure than outlet 18, the gas flows radially outward through the perforated catalyst retainers and the catalyst of catalyst bed 20. As the gas contacts the catalyst in the catalyst bed, it reacts to form hydrocarbons, according to the Fischer-Tropsch mechanism. The annular configuration and substantially radial gas flow produces a substantially uniform residence time for the gas in the catalyst bed.

The hydrocarbons produced in the Fischer-Tropsch process range from single-carbon methane gas, up to C11+ and higher. Some of the produced hydrocarbons are liquids at the Fischer-Tropsch reactor conditions. In a conventional fixed-bed reactor, these liquids would tend to accumulate in the interstices of the catalyst bed, thereby reducing the effectiveness of the catalyst for gas-to-liquid conversion. In the present reactor, however, the rotation of bed 20 produces sufficient centrifugal force to cause the liquid products to migrate radially outward, "falling" toward outer catalyst retainer 24. Once at the outer surface of retainer 24, the produced liquids flow under the force of gravity to the floor of the reactor, and then out through outlet 18. If the rotation rate of the catalyst bed is high enough, droplets of liquid may be flung outward from the surface of retainer 24 and may or may not reach housing 12 before dropping to the bottom of outer chamber 27. In any event, the rotation of the bed tends to facilitate removal of produced liquids from the catalyst surfaces and thereby increases operating efficiency.

It is preferred that bed 20 rotate with sufficient angular velocity to generate a centrifugal force at least as great as the force of gravity and, more preferably, at least about two times the force of gravity. Because the radial acceleration resulting from rotation of the reactor can be controlled, the residence time of the produced liquids in the reactor can be controlled to some extent. Because outer retainer 24 is perforated, the thickness of the catalyst bed places an upper limit on the residence time, since liquids reaching retainer 24 exit the bed and are no longer in contact with the catalyst. At the same time, the residence time cannot be longer than the time that it would take the liquids to fall downward through the height of the bed under the force of gravity alone.

An example of a preferred technique for setting the centrifugal force generated by rotating the bed 20 is as follows. For a bed 20 of radius R rotating at an angular velocity of w(rev/sec), the radial acceleration at the outer surface of the bed is given by $v2/R$, where $v=2\pi Rw$. Thus, for an annular bed 20 having an outer radius equal to 10 cm, the angular velocity w required to generate a force at the outer radius equal to the acceleration of gravity (980 cm/sec2) is only 1.57 rev/sec. The angular velocity w required to generate a force at the outer radius equal to twice the gravitational force is only 2.23 rev/sec.

Hence, it is relatively easy to generate within the particle bed a radial acceleration that is greater than the acceleration of gravity and thus remove liquid products from the catalyst bed more efficiently than by using gravity alone to remove the liquids. While the radial acceleration can be increased by increasing the rotation rate, it may be preferred to allow the liquid products to remain in contact with the catalyst for some amount of time. In addition, the type of catalyst system, i.e. its permeability of the catalyst bed, will affect how quickly liquids pass through the bed. Hence, selection of the preferred rotation rate will depend on the reactor dimensions, the type of catalyst bed, and the desired residence time.

Various modifications to the embodiments described above can be made. For example, outer retainer 24 can be constructed to include grooves or channels that direct liquids leaving the bed 20 to a desired point. Likewise, the rotation of bed 20 need not be continuous, but can be pulsed or intermittent, with the rate of rotation varying between a predetermined upper value and a predetermined lower value, with the lower value including zero rotation. If desired, rotation of bed 20 can be controlled by feedback from the reactor itself. For example, the mounting of bed 20 can include a weight sensor. Upon the accumulation of liquids in bed 20, the weight sensor produces a signal that in turn causes bed 20 to be rotated. Bed 20 can be rotated for a predetermined amount of time or until the sensor signal indicates that the liquid level in bed 20 has returned to a desired level. Alternatively, intermittent rotation of bed 20 can be controlled by a timer, with the length of the rotational and non-rotational periods being independently predetermined.

Gases produced in reactor 20 exit via gas outlet 16, while liquids produced in reactor 20 exit via outlet 18. The gases can be burned, exported from the system, recycled through the Fischer-Tropsch process via recycle line 17, or otherwise disposed of as desired. Similarly, the liquid hydrocarbons exiting via outlet 18 can be burned, exported from the system, or otherwise disposed of as desired.

Catalyst

The present methods can be used in conjunction with any gas to liquid catalysis system, including any suitable Fischer-Tropsch catalyst system, including supported and unsupported catalysts. Since the reactor uses a fixed bed, the catalyst system is not subjected to the mechanical erosion that increases catalyst attrition in slurry reactors. Hence, catalyst systems that are not robust enough for slurry bed reactors can be used in the present system. The catalytically active materials can include but are not limited to iron, nickel, cobalt, ruthenium, and combinations thereof, with and without one or more promoters such as manganese, vanadium, platinum, palladium and other elements, such as are known in the art. These catalysts can be supported on suitable catalyst supports, or can be provided in an unsupported form, so long as sufficient catalytic area and gas flow area are provided.

Feed Gases

During conversion, the Fischer-Tropsch reactor is charged with feed gases comprising hydrogen or a hydrogen source and carbon monoxide. $H_2/CO$ (syngas) mixtures suitable as a feedstock for conversion to hydrocarbons according to the process of this invention can be obtained from light hydrocarbons such as methane by means of steam reforming or partial oxidation. The hydrogen is preferably provided by free hydrogen, although some Fischer-Tropsch catalysts have sufficient water gas shift Fischer-Tropsch activity to convert some water to hydrogen for use in the Fischer-Tropsch process. It is preferred that the mole ratio of hydrogen to carbon monoxide in the feed be greater than 0.5:1 (e.g., from about 0.67:1 to 2.5:1). The feed gas may also contain carbon dioxide or other compounds that are inert under Fischer-Tropsch reaction conditions, including but not limited to nitrogen, argon, or light hydrocarbons. The feed gas stream should contain a low concentration of compounds or elements that have a deleterious effect on the catalyst. The feed gas may need to be treated to ensure low concentrations of sulfur or nitrogen compounds such as hydrogen sulfide, ammonia and carbonyl sulfides.

During conversion, the gas hourly space velocity through the reaction zone may range from about 100 volumes/hour/ volume catalyst (v/hr/v) to about 10,000 v/hr/v. The reaction zone temperature is typically in the range from about 160° C. to about 300° C. Preferably, the reaction zone is operated at conversion promoting conditions at temperatures from about 190° C. to about 260° C. The reaction zone pressure is typically in the range of about 80 psig (653 kPa) to about 1000 psig (6994 kPa).

While the preferred embodiments of the invention have be disclosed herein, it will be understood that various modifications can be made to the system described herein without departing from the scope of the invention. For example, the various inlet, outlet and cooling lines and the catalyst bed itself can be reconfigured, the mechanism used to provide the rotational force tot he catalyst bed can be varied, and the placement and type of feed gas inlet can be altered. Without further elaboration, it is believed that one skilled in the art can, using the description herein, utilize the present invention to its fullest extent.

What is claimed is:

1. A method for converting syngas to hydrocarbons according to a Fischer-Tropsch reaction, comprising:

(a) providing a rotatable catalyst bed comprising a Fischer-Tropsch catalyst;

(b) feeding a syngas stream into the catalyst bed and providing a pressure drop across the catalyst bed such that the syngas stream flows through the catalyst bed so as to produce a gas output and a liquid product;

(c) rotating the catalyst bed so as to enhance passage of said liquid product from the catalyst bed, such rotation being such that the radial acceleration of a particle in the bed is at least two times the acceleration of gravity.

2. The method according to claim 1, including rotating the catalyst bed continuously.

3. The method according to claim 1, including rotating the catalyst bed intermittently.

4. The method according to claim 1, including rotating the catalyst bed in response to a signal from a sensor.

5. The method according to claim 4 wherein the signal is indicative of the weight of the catalyst bed.

6. A method for converting syngas to hydrocarbons according to a Fischer-Tropsch reaction, comprising:

(a) providing a rotatable catalyst bed comprising a Fischer-Tropsch catalyst;

(b) feeding a syngas stream into the catalyst bed and providing a pressure drop across the catalyst bed such that the syngas stream flows through the catalyst bed so as to produce a gas output and a liquid product; and (c) rotating the catalyst bed so as to enhance passage of said liquid product from the catalyst bed, such rotation being such that the radial acceleration of a particle in the bed is at least two times the acceleration of gravity;

wherein step (c) is carried out in response to a weight signal from a sensor, including rotating the catalyst bed when the weight signal indicates that a predetermined amount of liquid product is present in the catalyst bed.

7. The method according to claim 1, including rotating the catalyst bed in response to a signal from a timer.

8. A method for converting a feed gas to a liquid product, comprising:

(a) providing a rotatable catalyst bed comprising a catalyst;
(b) contacting a feed gas stream with the catalyst so as to produce a gas output and a liquid product;
(c) rotating the catalyst bed so as to enhance passage of the liquid product from the catalyst bed, said rotation being such that the radial acceleration of a particle in the bed is at least two times the acceleration of gravity.

9. The method according to claim 8, including rotating the catalyst bed continuously.

10. The method according to claim 8, including rotating the catalyst bed intermittently.

11. The method according to claim 8, including rotating the catalyst bed in response to a signal from a sensor.

12. The method according to claim 11 wherein the signal is indicative of the weight of the catalyst bed.

13. The method according to claim 12 including rotating the catalyst bed when the weight signal indicates that a predetermined amount of liquid product is present in the catalyst bed.

14. The method according to claim 8, including rotating the catalyst bed in response to a signal from a timer.

15. The method according to claim 8, including providing a pressure drop across the catalyst bed.

16. The method according to claim 8 wherein the feed gas is syngas.

17. The method according to claim 8, wherein the catalyst is a Fischer-Tropsch catalyst.

* * * * *